United States Patent [19]

Hoffmann

[11] 3,899,440
[45] Aug. 12, 1975

[54] APPARATUS FOR CONTINUOUS ACID TREATMENT OF SOAPSTOCK

[75] Inventor: Yngve Birger Lowenhaupt Hoffmann, Helsingborg, Sweden

[73] Assignee: AB Pellerin/Zenith, Helsingborg, Sweden

[22] Filed: Jan. 17, 1974

[21] Appl. No.: 434,007

[30] Foreign Application Priority Data
Jan. 18, 1973 Sweden............................ 73006793

[52] U.S. Cl. .............. 252/371; 159/16 R; 159/16 S
[51] Int. Cl.². ..................... B01D 1/14; C11D 13/00
[58] Field of Search.......... 159/DIG. 14, D25, 16 R, 159/16 S; 252/371, 550, 367–370; 23/267 MS, 283, 284, 260

[56] References Cited
UNITED STATES PATENTS

| 900,203 | 8/1926 | Quinker............................ 159/16 S |
| 2,405,158 | 8/1946 | Mensing.......................... 23/267 MS |
| 2,630,376 | 3/1953 | Dunn.............................. 23/267 MS |
| 3,368,874 | 2/1968 | Ludewig........................... 23/260 X |
| 3,492,097 | 1/1970 | Moles et al. ........................ 23/284 |
| 3,533,829 | 10/1970 | Quanquin.................... 159/16 R UX |

Primary Examiner—Jack Sofer
Attorney, Agent, or Firm—Blair & Brown

[57] ABSTRACT

Apparatus for continuous acid treatment of soapstock which derives from the refining of fats and fatty oils with lye. The apparatus comprises an elongate vertical reaction vessel which has supply pipes for soapstock, acid, and steam for agitation. The reaction vessel is closed at the bottom and provided with an overflow at the top. The pipe for soapstock opens at the bottom of the reaction vessel, while the pipes are acid and agitating steam are perforated longitudinally. The overflow is in communication with a separating device for separating, because of different densities, fatty acid from the aqueous solution. The separating device is a tank which is divided into several compartments by means of vertical partitions. The partitions are formed at the top and the bottom with openings for the passage of fatty acid and aqueous solution, respectively.

5 Claims, 5 Drawing Figures

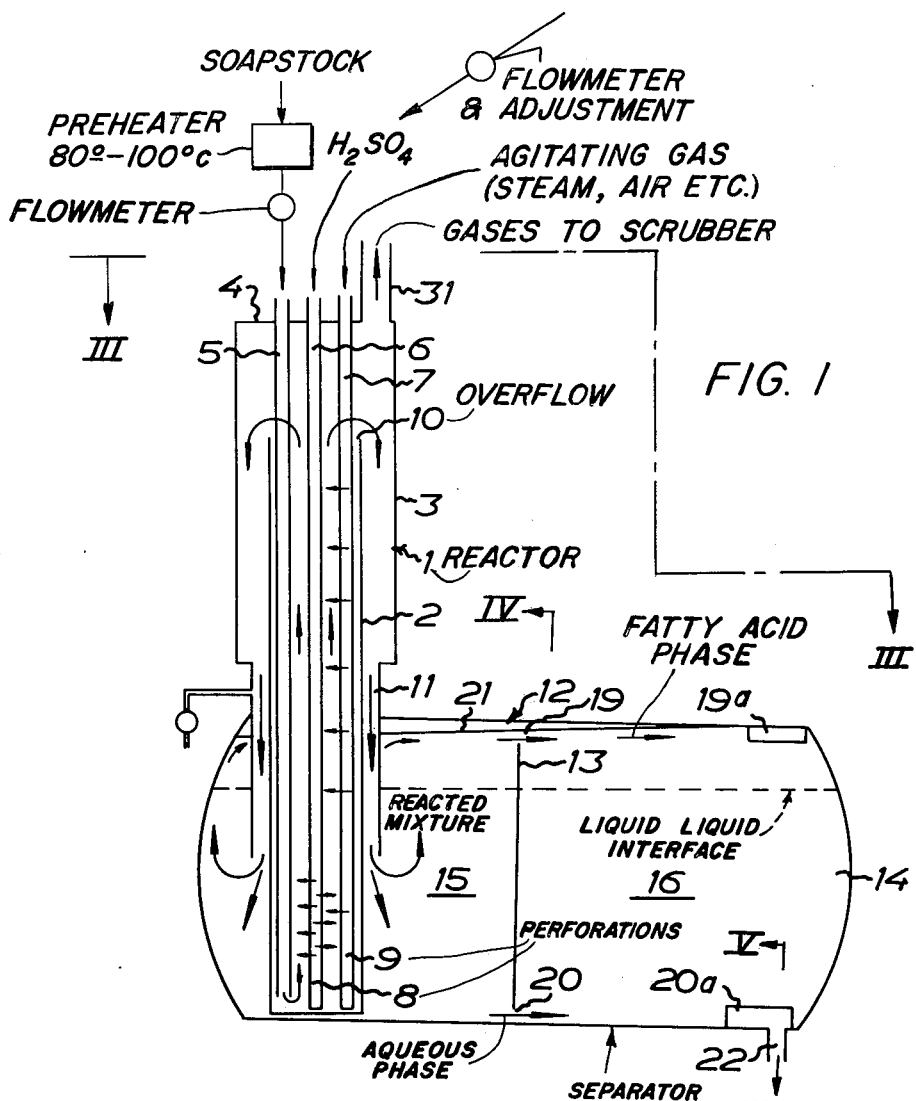
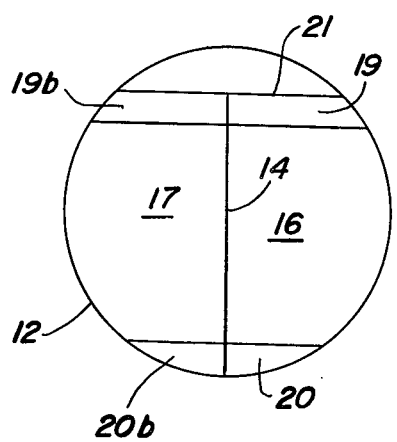
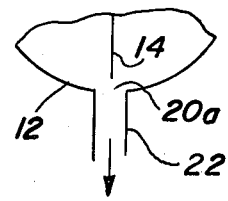

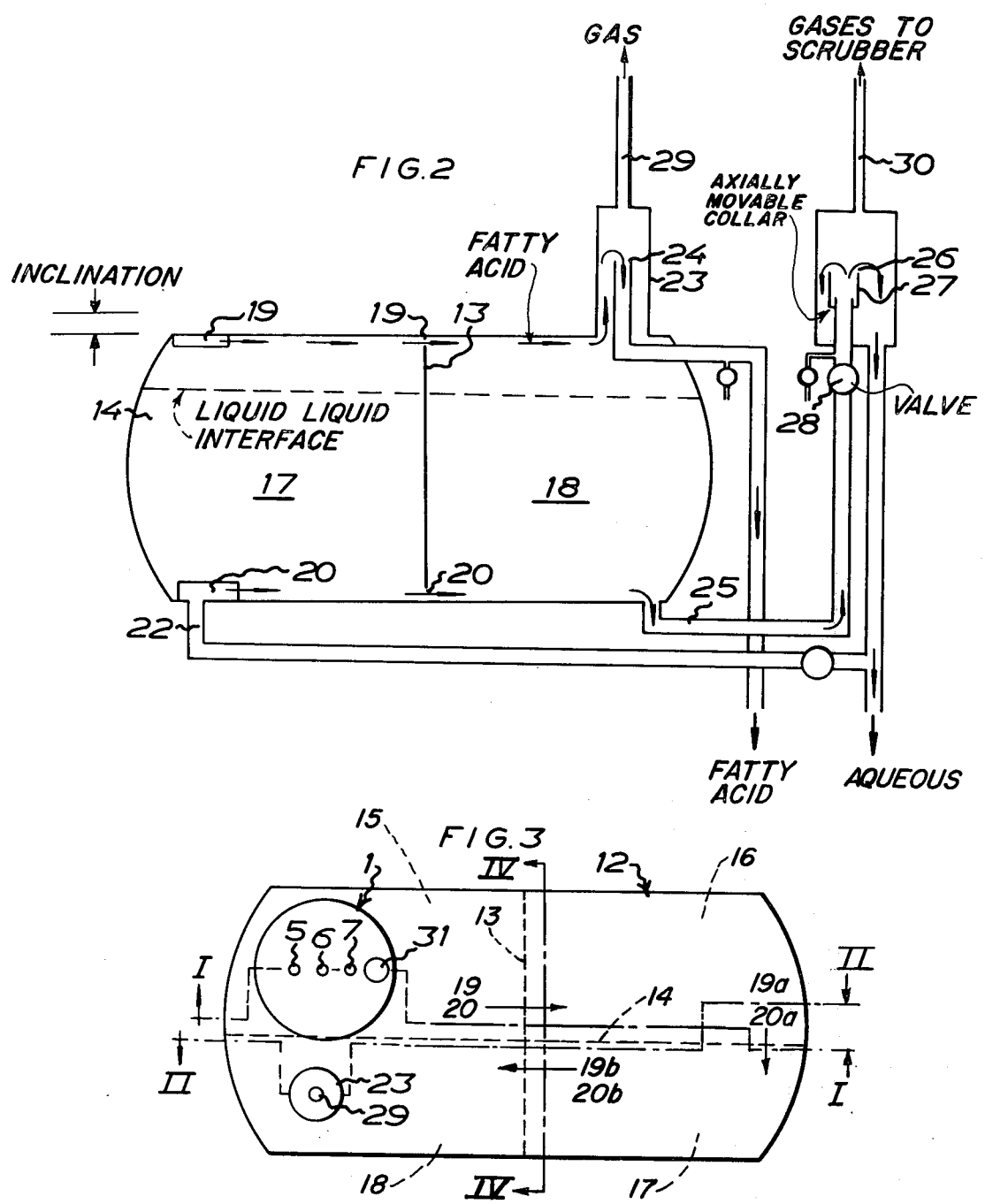

APPARATUS FOR CONTINUOUS ACID TREATMENT OF SOAPSTOCK

This invention relates to an apparatus for continuous acid treatment of soapstock which has been obtained at the refining of fats, including fatty oils, with lye and which contains fatty acid soaps, whereby the fatty acid soaps are converted into free fatty acids.

Most fats, among them fatty oils, that are used in the manufacture of foodstuffs, such as margarine, contain in the condition they have been recovered from the vegetable or animal raw material a great or small amount of free fatty acids which has to be removed. This is done by refining with alkali. The refining is usually carried out as wet refining which can be effected batchwise or continuously and comprises treating the fat with an aqueous solution of alkali, i.e. lye, mostly soda lye, for the neutralization of the fat by conversion of the free fatty acids in the fat into soaps. In the wet refining operation the resulting soaps are dissolved or suspended in the lye and are separated from the fat together with the more or less spent lye as soapstock. After that the fat is further treated int.al. bleached with bleaching earth while the soapstock is treated with acid to recover from the fatty acid soaps the free fatty acids which are then separated from the aqueous solution acidified by the acid treatment. Such an acid treatment, so-called soap splitting of soapstock for obtaining free fatty acids has been carried out until now as a batch procedure by admixing to a vessel containing a certain amount of soapstock, a determined amount of acid and after reaction allowing the resulting mixture to rest so that the lighter fatty acid is separated from the heavier aqueous solution. Moreoever, the apparatus utilized has not been of the closed type and unpleasant smell has been produced, for which reason one has preferred, when refining fats, to locate the soap splitting outside the factory premises, which has implied an undesirable spreading of equipment and a heavier dirtying and corrosion of the soap splitting apparatuses.

The present invention has for its object to eliminate the above-mentioned disadvantages and to provide a new and superior apparatus for acid treatment of soapstock. By constructing the apparatus as a system which is substantially closed to the surroundings, the earlier inconveniencing smell is avoided, and partly for this reason and partly because of its compact construction the apparatus according to the invention is apt to be installed together with the other refining apparatuses in the factory building itself. The apparatus according to the invention, further, is constructed for continuous operation and in its preferred embodiment has no mobile parts.

According to the invention, there is provided an apparatus for continuous acid treatment of soapstock which has been obtained at the refining of fats, including fatty oils, with lye and which contains fatty acid soaps, whereby the fatty acid soaps are converted into free fatty acids, said apparatus being characterized in that it comprises an elongate vertical reaction vessel which has a supply pipe for soapstock, a supply pipe for acid, and agitating means for agitation of the reaction mixture of soapstock and acid in the reaction vessel, the supply pipe for soapstock opening at the bottom of the reaction vessel, while the supply pipe for acid which extends longitudinally of the reaction vessel has perforations along its extension in the lower part of the reaction vessel for successive supply of acid, and at its upper end the reaction vessel has an overflow for withdrawing reacted mixture of soapstock and acid from the reaction vessel, said overflow being in communication with a separating device which includes one or more interconnected containers for dividing the reacted mixture, because of different densities, into fatty acid and aqueous solution separated therefrom, said separating device being provided at its upper part with an outlet for fatty acid and at its lower part with an outlet for aqueous solution, and the reaction vessel and the separating device are substantially closed to the outer surroundings.

According to a preferred embodiment of the invention, the reaction vessel comprises an inner vessel which is closed at the bottom and open at the top for the formation of the overflow, an outer vessel which is open at the bottom and has a cover at its upper end and which is arranged around the inner vessel so that an outlet gap is formed between the inner vessel and the outer vessel, said outlet gap being in direct communication with the separating device for conducting the reacted mixture via the overflow of the inner vessel through the outlet gap to the separating device, and the agitating means is a pipe which together with the supply pipes for soapstock and the acid extends through the cover of the outer vessel down into the inner vessel and towards the bottom thereof, the pipe for agitation having perforations along substantially its entire extension in the inner vessel for supplying gas acting as agitating medium.

According to a further preferred embodiment, the separating device is a recumbent container which by means of at least one vertical partition is divided into separation spaces which are in communication with one another through recesses in the upper and lower portion of the partition, and the first separating space is connected to the reaction vessel for supplying reacted mixture, while the outlets for fatty acid and aqueous solution are arranged in the last separating space.

Preferably, the separating device is inclined to the horizontal and the reaction vessel is built together with the separating device in that it is introduced into the first separating space so that the outlet gap opens directly into the first separating space. To realize a better function the separating device has preferably vertical partitions both transversely and longitudinally of the container.

The invention will be more fully described hereinbelow and with reference to the accompanying drawings which illustrate a preferred embodiment of the invention.

In the drawings:

FIG. 1 shows a section of the apparatus on line I—I in FIG. 3;

FIG. 2 shows a section of the same apparatus on line II—II of FIG. 3;

FIG. 3 is a plan view of the apparatus according to FIGS. 1 and 2 and shows the location of the section lines in these figures.

FIG. 4 is a vertical transverse section showing the orifices in plate 13.

FIG. 5 is a partial transverse vertical section showing the aqueous orifice between chambers 16 and 17.

In FIGS. 1 and 3, 1 is a reaction vessel which consists of an inner elongate vertical cylinder 2 which is closed at the bottom and open at the top. An outer cylinder 3 is arranged concentrically about the inner cylinder 2 and is open at the bottom and provided with a cover 4 at the top. Three pipes 5, 6 and 7 extend through the cover 4 of the outer cylinder 3.

The pipe 5 is a supply pipe for soapstock which has earlier passed a flow meter (not shown) which is preferably connected to a control means so that the supplied amount of soapstock can be measured and adjusted at the desired value. The soapstock has also passed a heating device (not shown) such as a steam jacket, for preheating it to a temperature of about 80°–100°C, preferably 90°–95°C. This elevated temperature is required in order that the reaction with the acid shall develop satisfactorily. Having passed through the cover 4 the supply pipe 5 extends down into the inner cylinder 2 and opens short of the bottom thereof. After the above-mentioned preliminary measures the soapstock will thus flow downwards through the pipe 5 and into the inner cylinder 2 at the bottom thereof.

The pipe 6 is a supply pipe for acid which like the soapstock has first been subjected to measuring and adjustment of the supplied amount. This amount is adjusted and dimensioned in relation to the amount of soapstock, it being considered that the acid shall, on the one hand, neutralize excess lye in the soapstock, which may, for example, be 0.1 N with respect to NaOH, and, on the other hand, convert the fatty acid soaps into free fatty acids and finally also acidify the aqueous phase of the soapstock. As acid use is normally made of sulphuric acid, although other acids, also of course, are useful if desired. The supply pipe 6 extends in parallel with the pipe 5 downwards into the inner cylinder 2 and terminates at the bottom thereof. Contrary to the pipe 5, however, the pipe 6 is not open but closed at the bottom, and for the feed of the acid the pipe 6 has a plurality of holes or perforations 8 along its lower part. This construction has proved to give obvious advantages compared to a construction in which the pipe 6 is imperforate and the feed of the acid is realized through the open lower end of the pipe. In the construction according to the invention, the acid in fact is supplied not only at a single point but along a considerable portion of the axial extension of the cylinder 2. AT the flow taking place in the cylinder 2 from the bottom thereof towards its upper open end the soapstock will be successively brought together with newly added acid, whereby a more uniform, quicker and more complete reaction is ensured than with a pipe having but one feed opening.

The pipe 7 is a supply pipe for gas which has an agitating effect on the reaction mixture in the cylinder 2. As agitating gas, use is preferably made of steam, but other gases also, such as air, can be used. To provide a complete agitation of the liquid mixture in the cylinder 2 the pipe 7 extends downwards in the cylinder 2 to the bottom thereof and is provided along its entire extension in the inner cylinder 2 with perforations 9 through which the agitating gas escapes. It is realized that apart from gas other agitating media are also useful, such as mechanical agitators in the form of impellers or like means. The construction, preferred according to the invention and including a perforated pipe for the supply of gas, implies, however, the advantage that mobile parts are dispensed with. By arranging the perforations over the entire extension of the pipe in the cylinder 2 a uniform and complete agitation is obtained.

Having been mixed and having reacted in the inner cylinder 2 the reaction mixture flows out of the inner cylinder over an overflow 10 and then down into the outlet gap 11 formed between the outer wall of the inner cylinder 2 and the outer cylinder 3 arranged concentrically about the inner cylinder. As shown in FIG. 1, the outlet gap 11 opens directly into a separating device 12 into which the reaction mixture flows for the separation of the resulting free fatty acid from the remaining aqueous solution. The construction illustrated in which the reaction vessel 1 has been built together with the separating device 12, provides an extremely compact apparatus and eliminates unnecessary connections between the reaction vessel and the separating device. The "clean" design of the construction will, moreover, reduce the number of flange couplings and like connections between various elements to a minimum. This is desirable since such couplings at temperature variations, for example because of shut-down during weekends, tend to become sources of leakage. The separating device 12 illustrated comprises a recumbent cylindrical container which has been divided by vertical partitions 13 and 14 in the transverse and longitudinal direction, respectively, of the container into four separating spaces 15, 16, 17 and 18. The partition 14 seals against the top partion 21, the bottom and the two ends of the container while partition 13 does not reach the bottom but seals agains partition 21 and the sides. The separating spaces are interconnected in series by orifices 19, 19a, 19b, and 20, 20a, 20b, formed in the upper and lower portions, respectively, of the partitions 13 and 14. As mentioned above, the reaction vessel is built together with the separating device 12, which has been realized after its introduction into the first separating space 15. The reacted mixture of soapstock and acid flows into said space 15 through the outlet gap 11 in order then to be divided into an upper fatty acid phase and a lower aqueous phase because the fatty acid formed at the reaction has a lower density (about 0.9 g/cm$^3$) than the remaining aqueous solution (about 1.2 g/cm$^3$). In the first separating space 15 there takes place a coarse division of the reaction mixture, which division is then successively concluded in the separating spaces 16, 17 and 18, the fatty acid phase flowing from separating space to separating space via the upper recesses 19, while the aqueous phase flows via the lower recesses 20. It should be observed that the separating container has been inclined slightly to the horizontal in order that the space available to the formed fatty acid shall progressively increase on its way from the separating space 15 to the separating space 18 and collection of fatty acid phase in the first separating spaces shall be avoided. As will appear from FIG. 1, the inclination will be in the wrong direction and the separating spaces 15 and 16. This is counteracted and the correct inclination is attained in that the container is equipped with an additional sloping ceiling 21. By reason of the inclination of the container sludge, if any, and other heavy impurities will be moved towards the lowest point of the container in order to be led away there through an outlet 22.

The last separation space 18 is equipped with an outlet 23 for separated fatty acid, which outlet is located at the upper portion of the space and includes an overflow 24. Moreover, the separating space 18 is provided at its lower end with an outlet 25 for the aqueous phase separated from the fatty acid. Like the outlet 23, the outlet 25 includes an overflow 26 which is located at a lower level than the overflow 24 in view of the different densities of the fatty acid and the aqueous phase. Suitably, the overflow is formed with a vertically movable collar 27, whereby the difference in level between the overflow 24 and the overflow 26 can be adjusted to the desired value. If is is desired, for example, to empty the separating container 12 of fatty acid the collar 27 is raised to a level with or above the overflow 24. The corresponding result can be attained by closing the valve 28 which is arranged on the outlet conduit below the overflow 26.

Gases, if any, from the outlets 23 and 25 are removed via conduits 29 and 30 and led to a conventional scrubber (not shown), before they are allowed to escape into the atmosphere. Connected to the scrubber also is a conduit 31 from the reaction vessel 1 for leading away gases, if any, therefrom. The insignificant amounts of gases escaping from the scrubber have proved not to bring any inconvenience in the form of smell or such like. Apart from the scrubber, the apparatus according to the present invention thus forms a system which is wholly closed to the outer environment, with the aforementioned advantages thus attained.

The invention has been described in the foregoing with reference to a preferred embodiment thereof, but it is realized that the invention is not restricted to this very embodiment and that various modifications can be resorted to within the scope of the invention such as it will appear from the appended claims. Thus, the reaction vessel need not be built together with the separating device but can be separated from it. Furthermore, the reaction vessel need not comprise two cylinders of different diameters but can be a single cylinder which is closed at the bottom, has a cover at the top and an outlet pipe functioning as an overflow and arranged between the two ends of the cylinder. The separating vessel illustrated need not be a single cylindrical container which is internally divided into several separating spaces, but can be replaced by a number of vessels stacked on top of each other or arranged after each other, said vessels being series-connected as are the separating spaces illustrated.

What I claim and desire to secure by Letters Patent is:

1. An apparatus for continuous acid treatment of soapstock which has been obtained from the refining of fats, including fatty oils, with lye, and which contains fatty acid soaps, whereby the fatty acid soaps are converted into free fatty acids, characterized in that it comprises an elongate vertical reaction vessel (1) consisting of an inner vessel (2) which is closed at the bottom and open at the top to form an overflow (10), an outer vessel (3) which is open at the bottom and has a cover (4) at its upper end and which is arranged around the inner vessel (2) so that an annular outlet space (11) is formed between said vessels (2, 3), the reaction vessel having a supply pipe (5) for soapstock, a supply pipe (6) for acid and a supply pipe (7) for gas for agitating reaction mixture of soapstock and acid in the inner vessel (1), said pipes (5, 6, 7) extending through the cover (4) down into the inner vessel (2) and terminating just above the bottom thereof, and the supply pipe (5) for soapstock opening at the bottom of the inner vessel (2), while the supply pipe (6) for acid is closed at its lower end and has perforations (8) along its extension in the lower part of the inner vessel (2) for successively supplying acid, and the tubular agitating means (7) which also is closed at its lower end, has perforations (9) along substantially its entire extension in the inner vessel (2) for supplying gas acting as agitating medium, and that the reaction vessel (1) through the overflow (10) and the outlet space (11) is in direct communication with a separating device (12) for withdrawing reacted mixture of soapstock and acid from said reaction vessel (1) to said separating device (12) which includes one or more serially interconnected containers for gravitationally separating the reacted mixture, because of its different densities, into a lighter fatty acid and a heavier aqueous solution separated therefrom, said separating device (12) being provided at its upper part with an outlet (23) for fatty acid and at its lower part with an outlet (25) for aqueous solution, and the reaction vessel (1) and the separating device (12) being substantially closed to the outer surrounding.

2. An apparatus as claimed in claim 1, characterized in that the separating device is a recumbent container which by means of at least one vertical partition is divided into separation spaces which are in communication with one another through orifices in the upper and lower portion of the partition, and the first separating space in connected to the reaction vessel for supplying reacted mixture, while the outlets for fatty acid and aqueous solution are arranged in the last separating space.

3. An apparatus as claimed in claim 2, characterized in that the separating device is slightly inclined to the horizontal.

4. An apparatus as claimed in claim 2, characterized in that the reaction vessel is built together with the separating device in that it is introduced into the first separating space so that the outlet space opens directly into the first separating space.

5. An apparatus as claimed in claim 2, characterized in that the separating device has vertical partitions both transversely and longitudinally of the container with the upper and lower portions of said partitions having communicating orifices whereby several separating spaces (15, 16, 17, 18) are established which via the recesses (19, 20) in the upper and lower portions of the partitions (13, 14) communicate with one another to produce a liquid flow in series from the first separating space (15) via the intermediate separating spaces (16, 17) through the last separating space (18).

* * * * *